Aug. 3, 1965
W. YOGUS
3,198,037
TURRET NOSE BORING BAR
Filed May 7, 1964
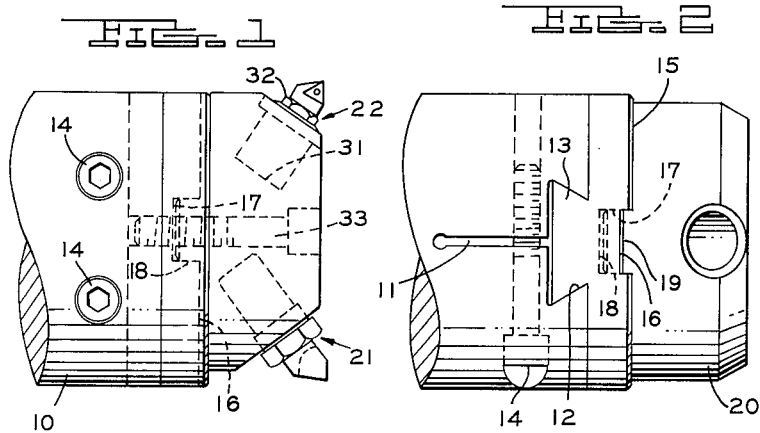
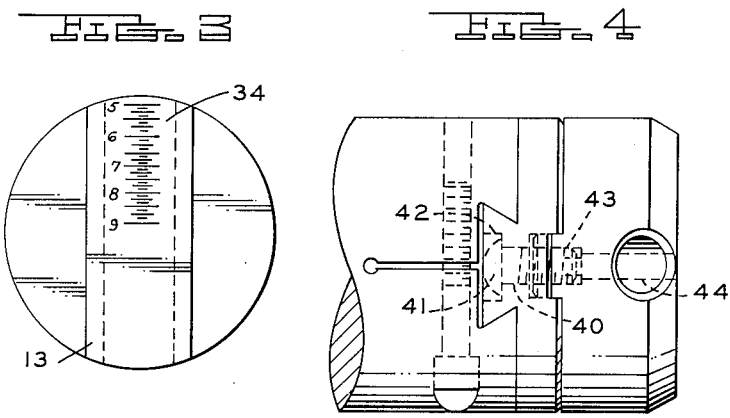
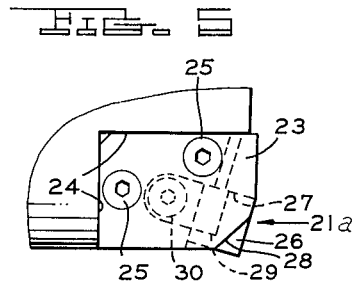
*INVENTOR.*
WILLIAM YOGUS
BY Farley, Forster
and Farley
*ATTORNEYS*

3,198,037
TURRET NOSE BORING BAR
William Yogus, Birmingham, Mich., assignor to The Valeron Corporation, Detroit, Mich., a corporation of Michigan
Filed May 7, 1964, Ser. No. 365,611
9 Claims. (Cl. 77—58)

This invention relates to a turret nose boring bar having a pair of cutter inserts indexable for rough and finish boring, mounted on a slide for radial adjustment of boring diameter. Preferably the insert cutters are preset off of the boring machine in an accurate gauging set-up to desired rough and finish bore dimensions using the slide to establish the effective cutting radius of the roughing cutter and a fine adjustment on the finish cutter insert to establish the effective finish cutting radius. With the boring bar thus preset it may be installed in a boring head and upon completion of the roughing cut the turret nose may be quickly indexed for the finishing operation thereby minimizing machine set-up time.

These and other objects of the invention may best be understood from the following description of a preferred embodiment and modification of the invention with reference to the drawings wherein:

FIG. 1 is a side elevation of the turret nose end of a boring bar constructed in accordance with the present invention;

FIG. 2 is a plan view thereof;

FIG. 3 is an end elevation of the turret slide illustrating the calibration of the roughing bore diameter;

FIG. 4 is a view similar to FIG. 2 showing a somewhat modified construction; and FIG. 5 is a fragmentary view of a modified heavy duty roughing cutter.

Referring to FIGS. 1 and 2 a boring bar 10 is split with a transverse end slot 11 projecting inwardly from a transverse dovetail keyway 12 capable of being tightened against a dovetail slide 13 by actuation of a pair of clamp screws 14. The slide is provided across its annular outer face 15 with a relatively shallow transverse keyway 16 and a relatively deeper central annular socket 17 for receiving an annular stub pilot 18 projecting axially beyond a transverse key 19 formed at the inner annular face of a turret nose 20 having a roughing tool cartridge 21 (or modified roughing tool cartridge 21a as shown in FIG. 5) and a finishing tool cartridge 22 mounted therein.

The roughing tool cartridge shown in FIG. 5 includes an insert body 23 seated in a shouldered pocket 24 in the turret nose, secured with a pair of screws 25, and an indexable cutter element 26 seated in a shouldered pocket 27 of the body 23 with a chipbreaker 28 and clamp 29, secured by clamp screw 30. The finishing cartridge 22 is an adjustable tool insert of the type disclosed in copending application, Serial No. 226,613 filed September 27, 1962, seated in a blind cylindrical hole 31 and providing a fine axial adjustment over a suitable range depending on the size of the boring bar, such as in the order of 3/16 inch in boring radius in the unit shown, through the turning of a micrometer adjustment 32.

As shown in FIG. 1 (omitted in FIG. 2) a machine screw 33 having its head seated in the turret nose and projecting axially through the pilot 18 into a threaded hole in the dovetail slide can be loosened sufficiently to permit retraction of the key 19 from the keyway 16 in the slide and 180° rotation of the turret nose while the pilot 18 remains engaged, whereupon retightening anchors the turret nose securely with the key 19 operating both to locate the effective boring tool and provide torque reaction for the boring operation.

As shown in FIG. 3, the rear face of the slide 13 may be graduated with a scale 34 indicating the boring diameter for the roughing cutter while a micrometer dial, not shown, on the finish cutter cartridge 22 will indicate adjustment in the finishing cut. Preferably, pre-setting of both cutters is effected with a gauging fixture or set-up by loosening the clamp screw 14 sufficiently for lateral movement of the slide 13 until the roughing cutter element reaches a gauge surface whereupon the clamp screw 14 is tightened, screw 33 loosened for 180° rotation of the turret nose 20, and re-tightened whereupon the adjustment screw 32 is actuated to bring the finishing cutter into registration with a second finish diameter gauge surface.

The modification shown in FIG. 4 illustrates a machine screw 40 having its head 41 seated within an annular recess 42 in the center of the dovetail 13, the screw extending into a threaded aperture 43 in the turret nose. The screw end is provided with a socket recess for an Allen wrench which may be inserted through the reduced aperture 44. This construction is preferred when the turret nose has a relatively small diameter and the boring inserts extend close to center.

While a preferred embodiment and modification have been described above in detail it will be understood that numerous further modifications might be resorted to without departing from the scope of the invention as defined in the following claims.

I claim:

1. An adjustable turret nose boring bar assembly comprising, a boring bar body, a transversely adjustable slide mounted at the end of said body, a rotatably adjustable turret nose pivotally mounted on said slide, and a plurality of cutter elements alternately positionable through rotation of said turret nose to roughing and finishing cut positions.

2. A boring bar as set forth in claim 1 wherein said slide and body end are provided with inner-engaging dovetail elements.

3. A boring bar as set forth in claim 1 wherein said body end is provided with a transverse dovetail slot, said slide is provided with an inner-engaging dovetail tongue, and clamping means are provided for securing said tongue against transverse movement.

4. A boring bar as set forth in claim 1 wherein said body end is provided with a transverse dovetail slot, said slide is provided with an inner-engaging dovetail tongue, and clamping means are provided for securing said tongue against transverse movement, said clamping means including a split in said body end, and clamping screw means extending through said split adapted upon tightening to reduce the width of said dovetail slot.

5. A boring bar as set forth in claim 1 wherein said turret nose and slide include inner-engaging cylindrical aperture and pilot elements.

6. A boring bar as set forth in claim 1 wherein said turret nose and slide include inner-engaging cylindrical aperture and pilot elements, and relatively shallower inner-engaging key and keyway elements whereby said turret nose may be rotated with said key and keyway elements disengaged while said aperture and pilot elements remain engaged.

7. A boring bar as set forth in claim 1 wherein at least one of said cutter elements include means for effecting radial adjustment relative to said turret nose.

8. A boring bar as set forth in claim 1 wherein at least the finishing cutter element includes means for effecting radial adjustment relative to said turret nose.

9. A boring bar as set forth in claim 3 including a calibrated scale on said slide for gauging the effective diameter of said boring bar.

No references cited.

WILLIAM W. DYER, JR., *Primary Examiner.*